(12) United States Patent 
Mai et al.

(10) Patent No.: US 12,497,914 B2
(45) Date of Patent: Dec. 16, 2025

(54) THREE-WAY CATALYTIC CONVERTER AND DEVICE FOR PROCESSING TAIL GAS

(71) Applicant: Shanghai Fusion Tech Co., Ltd., Shanghai (CN)

(72) Inventors: Wei Mai, Shanghai (CN); Sheng Zhu, Shanghai (CN); Chong Wang, Shanghai (CN); Hua Feng, Shanghai (CN); Jianzhe Li, Shanghai (CN); Jinjing Zhang, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 0 days.

(21) Appl. No.: 18/830,625

(22) Filed: Sep. 11, 2024

(65) Prior Publication Data

US 2025/0188857 A1 Jun. 12, 2025

(30) Foreign Application Priority Data

Dec. 7, 2023 (CN) .......................... 202323321422.2

(51) Int. Cl.
*F01N 3/10* (2006.01)
*F01N 3/20* (2006.01)
(Continued)

(52) U.S. Cl.
CPC ........... *F01N 3/101* (2013.01); *F01N 3/2013* (2013.01); *F01N 3/2853* (2013.01); *F01N 3/30* (2013.01);
(Continued)

(58) Field of Classification Search
CPC ...... F01N 3/101; F01N 3/2013; F01N 3/2853; F01N 3/30; F01N 13/008; F01N 13/0093;
(Continued)

(56) References Cited

U.S. PATENT DOCUMENTS

| 2011/0030344 A1* | 2/2011 | Gonze ................... F01N 3/2013 60/274 |
| 2013/0199165 A1* | 8/2013 | Kawase ................ F01N 3/2013 60/300 |

(Continued)

FOREIGN PATENT DOCUMENTS

| CN | 114215634 A | * | 3/2022 | |
| DE | 102020200734 A1 | * | 7/2020 | ............. F01N 13/10 |

(Continued)

*Primary Examiner* — Jorge L Leon, Jr.
(74) *Attorney, Agent, or Firm* — AVEK IP, LLC

(57) ABSTRACT

Three-way catalytic converters and devices for processing tail gases are disclosed. In some embodiments, a three-way catalytic converter includes a cylindrical housing, a three-way catalytic assembly provided in the cylindrical housing, a tail gas inlet and a tail gas outlet provided at the top of the cylindrical housing and communicated with the cylindrical housing, and a heater circumferentially wrapped around the outer side wall of the cylindrical housing. The three-way catalytic assembly is heated by energizing the heater. In other embodiments, a first cavity is formed between the three-way catalytic assembly and one end of the cylindrical housing, a second cavity is formed between the three-way catalytic assembly and another end of the cylindrical housing, the tail gas inlet is connected with the first cavity, and the tail gas outlet is connected with the second cavity.

10 Claims, 2 Drawing Sheets

(51) Int. Cl.
*F01N 3/28* (2006.01)
*F01N 3/30* (2006.01)
*F01N 13/00* (2010.01)
*F01N 13/14* (2010.01)
*F01N 13/18* (2010.01)

(52) U.S. Cl.
CPC ........ *F01N 13/008* (2013.01); *F01N 13/0093* (2014.06); *F01N 13/0097* (2014.06); *F01N 13/14* (2013.01); *F01N 13/1827* (2013.01); *F01N 2240/16* (2013.01); *F01N 2270/10* (2013.01); *F01N 2470/22* (2013.01); *F01N 2510/02* (2013.01); *F01N 2560/06* (2013.01); *F01N 2560/08* (2013.01)

(58) Field of Classification Search
CPC .. F01N 13/0097; F01N 13/14; F01N 13/1827; F01N 2240/16; F01N 2270/10; F01N 2470/22; F01N 2510/02; F01N 2560/06; F01N 2560/08
USPC .......................................... 60/300, 303, 320
See application file for complete search history.

(56) References Cited

U.S. PATENT DOCUMENTS

| | | | |
|---|---|---|---|
| 2013/0305692 A1* | 11/2013 | Hashimoto | F01N 3/10 60/299 |
| 2018/0111474 A1* | 4/2018 | Yamashita | F01N 3/20 |
| 2018/0258827 A1* | 9/2018 | Kuramashi | F01N 13/14 |
| 2022/0065147 A1* | 3/2022 | Sugaya | F01N 13/1805 |
| 2024/0191643 A1* | 6/2024 | Kuroki | F01N 3/2026 |

FOREIGN PATENT DOCUMENTS

| | | | | |
|---|---|---|---|---|
| DE | 102021107092 A1 | * | 9/2022 | |
| DE | 102021211939 A1 | * | 4/2023 | ........ F01N 13/0093 |
| FR | 3107554 A1 | * | 8/2021 | ........... F01N 13/009 |

\* cited by examiner

THREE-WAY CATALYTIC CONVERTER AND DEVICE FOR PROCESSING TAIL GAS

CROSS REFERENCE TO RELATED APPLICATIONS

This application claims priority to Chinese patent application number 202323321422.2, filed on Dec. 7, 2023, the disclosure of which is incorporated by reference herein in its entirety.

FIELD OF THE DISCLOSURE

The disclosure relates generally to the field of apparatus for processing tail gases. More specifically, the disclosure relates to three-way catalytic converters and devices for processing tail gases.

BACKGROUND

Three-way catalysis refers to catalysis that harmful gases such as CO, HC and NOx are converted into harmless carbon dioxide, water and nitrogen through oxidation and reduction. A three-way catalytic converter is mainly applied. The three-way catalytic converter mainly consists of a ceramic carrier, a precious metal or rare-earth coating, a metal casing and the like.

The three-way catalytic converter is commonly used for processing a tail gas of a vehicle and an industrial exhaust gas containing aldehydes, olefins, NOx, CO and so on. Problems such as low catalytic efficiency and incomplete catalysis occur from time to time in the process of practical application. In the prior art, increasing the thickness and uniformity of a precious metal plating layer, and the surface area of a ceramic carrier also promotes catalytic quality, but to a certain extent, also brings economic pressure to an enterprise and a user.

No effective solution has been proposed to solve the problem of excessive requirements for the thickness and uniformity of a plating layer, and the surface area of the ceramic carrier caused by the need to enhance catalytic efficiency in the related art.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provide a three-way catalytic converter, including a cylindrical housing, a three-way catalytic assembly, a tail gas inlet, a tail gas outlet, and a heater. The three-way catalytic assembly is provided in the cylindrical housing, the tail gas inlet and the tail gas outlet are provided at top of the cylindrical housing and are connected with the cylindrical housing, and the heater is circumferentially wrapped around an outer side wall of the cylindrical housing, the three-way catalytic assembly being heated by energizing the heater.

Optionally, a first cavity is formed between the three-way catalytic assembly and one end of the cylindrical housing, a second cavity is formed between the three-way catalytic assembly and another end of the cylindrical housing, the tail gas inlet is connected with the first cavity, and the tail gas outlet is connected with the second cavity.

Optionally, an air-mixing inlet connecting port and a spare connecting port are provided at a bottom of the cylindrical housing, the air-mixing inlet connecting port is connected with the first cavity, and the spare connecting port is connected with the second cavity.

Optionally, the cylindrical housing is provided with two first connecting ports connected to a pressure detecting device connected with the first cavity and the second cavity.

Optionally, the cylindrical housing is provided with two second connecting ports connected to a temperature detecting device connected with the first cavity and the second cavity.

Optionally, the three-way catalytic assembly includes a plurality of three-way catalytic filter elements arranged in parallel in an axial direction along the cylindrical housing, and a third cavity is formed between two of the three-way catalytic filter elements.

Optionally, the three-way catalytic filter elements are detachably provided in the cylindrical housing.

Optionally, a periphery of the three-way catalytic filter elements is wrapped with a protective sleeve.

Optionally, the cylindrical housing includes a cylinder body, two cover plates, two thermal insulation sleeves, two brackets, and a sealing gasket, the cylinder body has two openings at two ends, the two cover plates are provided at the two ends of the cylinder body, two thermal insulation sleeves are provided on outer sides of the two cover plates, two brackets are provided at a bottom of the cylinder body and near two ends of the cylinder body, and the sealing gasket is provided between one of the two cover plates and the cylinder body.

In other embodiments, the disclosure provide a device for processing a tail gas, including the three-way catalytic converter.

In further embodiments, the three-way catalytic converter according to the disclosure includes a cylindrical housing, a three-way catalytic assembly provided in the cylindrical housing, a tail gas inlet and a tail gas outlet provided at the top of the cylindrical housing and communicated with the cylindrical housing, and a heater circumferentially wrapped around the outer side wall of the cylindrical housing. The three-way catalytic assembly is heated by energizing the heater.

Optionally, a first cavity is formed between the three-way catalytic assembly and the right end of the cylindrical housing. A second cavity is formed between the three-way catalytic assembly and the left end of the cylindrical housing. The tail gas inlet is communicated with the first cavity. The tail gas outlet is communicated with the second cavity.

Optionally, the three-way catalytic assembly consists of a plurality of three-way catalytic filter elements arranged in parallel in the axial direction of the cylindrical housing. A third cavity is formed between two of the three-way catalytic filter elements.

Optionally, the three-way catalytic filter element is detachably provided in the cylindrical housing.

Optionally, the periphery of the three-way catalytic filter element is wrapped with a protective sleeve.

Optionally, the cylindrical housing includes a cylinder body having an open structure at two ends, two cover plates provided at the two ends of the cylinder body, respectively, two thermal insulation sleeves provided on the outer sides of the two cover plates, and two brackets provided at the bottom of the cylinder body, and respectively near the two ends of the cylinder body. A sealing gasket is provided between the cover plate and the cylinder body.

Optionally, an air-mixing inlet connecting port and a spare connecting port are provided at the bottom of the cylindrical housing. The air-mixing inlet connecting port is communicated with the first cavity. The spare connecting port is communicated with the second cavity.

Optionally, the cylindrical housing is provided with two first connecting ports connected to a pressure detecting device communicated with the first cavity and the second cavity, respectively.

Optionally, the cylindrical housing is provided with two second connecting ports connected to a temperature detecting device communicated with the first cavity and the second cavity, respectively.

BRIEF DESCRIPTION OF THE DRAWINGS

Illustrative embodiments of the present disclosure are described in detail below with reference to the attached drawing figures.

DETAILED DESCRIPTION

Figure 1:
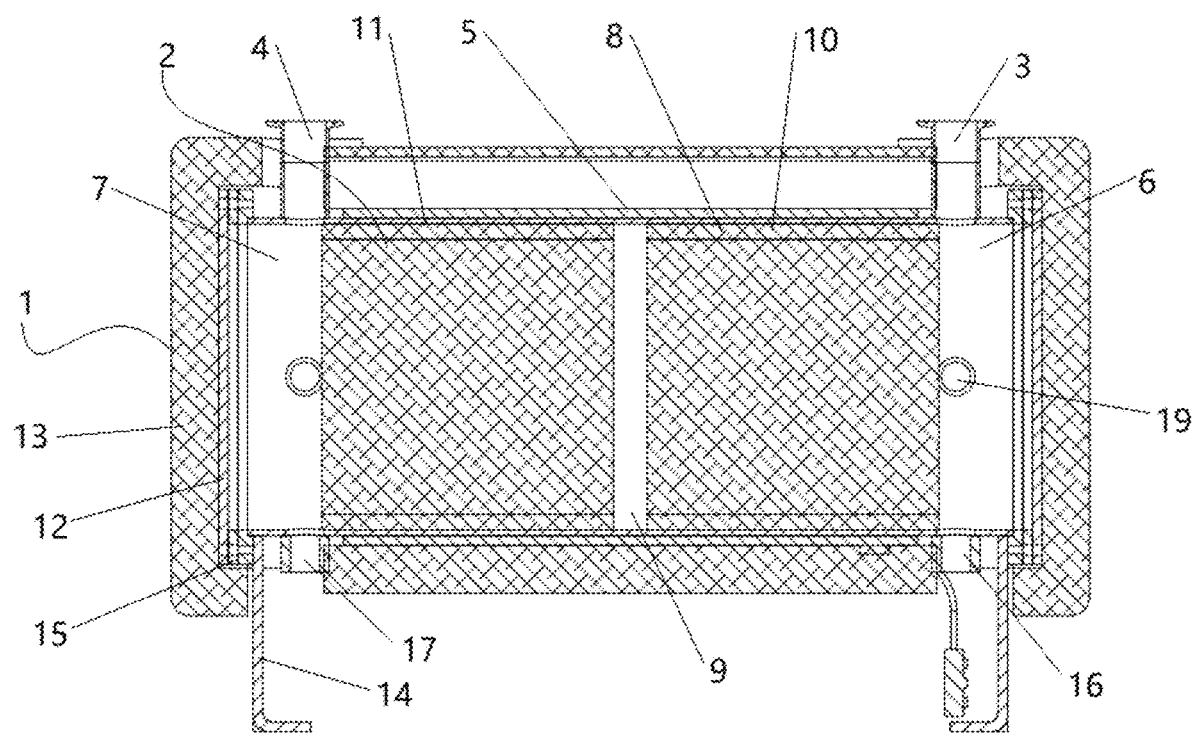
FIG. 1 shows a schematic diagram of a section of a three-way catalytic converter according to an embodiment of the disclosure.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

To enable a person skilled in the art to better understand the embodiments of the disclosure, the following clearly and completely describes the technical solutions in embodiments of the disclosure in conjunction with the accompanying drawings in the embodiments of the disclosure. Obviously, the described embodiments are a part of the embodiments of the disclosure, rather than all embodiments. Based on the embodiments of the disclosure, all other embodiments obtained by a person skilled in the art without inventive work shall fall within the protection scope of the disclosure.

It should be noted that the terms "first" and "second" in the description and claims of the disclosure and the forgoing drawings are used to distinguish similar objects, but are not necessarily used to describe a specific order or sequence. It should be understood that data so used may be interchangeable, where appropriate, for the embodiments of the disclosure described herein. In addition, the terms "include" and "have", and any variations thereof, are intended to cover non-exclusive inclusion, e.g., a process, a method, a system, a product or an apparatus that incorporates a series of steps or units need not be limited to those that are clearly enumerated, but may include other steps or units that are not clearly enumerated or are inherent to the process, the method, the product or the apparatus.

In the disclosure, orientation or positional relationships indicated by the terms "upper", "lower", "left", "right", "front", "back", "top", "bottom", "inside", "outside", "middle", "vertical", "horizontal", "transverse", "longitudinal", etc., are orientation or positional relationships based on the accompanying drawings. These terms are used primarily to better describe the present utility model and the embodiments thereof, and are not intended to define that indicated devices, elements, or assemblies should have a particular orientation, or be constructed and operated in a particular orientation.

Moreover, some of the forgoing terms may be used to indicate other meanings in addition to the orientation or positional relationships, for example, the term "upper" may also be used in some cases to indicate some relationship of dependency or connection. For a person skilled in the art, the specific meaning of these terms in the present utility model may be understood based on specific situations.

In addition, the terms "mounted", "provided", "provided with", "connected", "interconnected", and "sleeved" are to be understood in a broad sense. For example, "connected" may refer to fixed connection, detachable connection, or an integral structure, may refer to mechanical connection or electrical connection, may refer to direct connection, or indirect connection through an intermediate medium, or internal communication between two devices, two elements or two assemblies. A person skilled in the art may understand specific meanings of the forgoing terms in the embodiments of the utility model according to a specific situation.

It is to be noted that the embodiments of the disclosure and the features of the embodiments may be combined with each other without conflict. The disclosure will be described in detail below in combination with embodiments with reference to the accompanying drawings.

Figure 2:
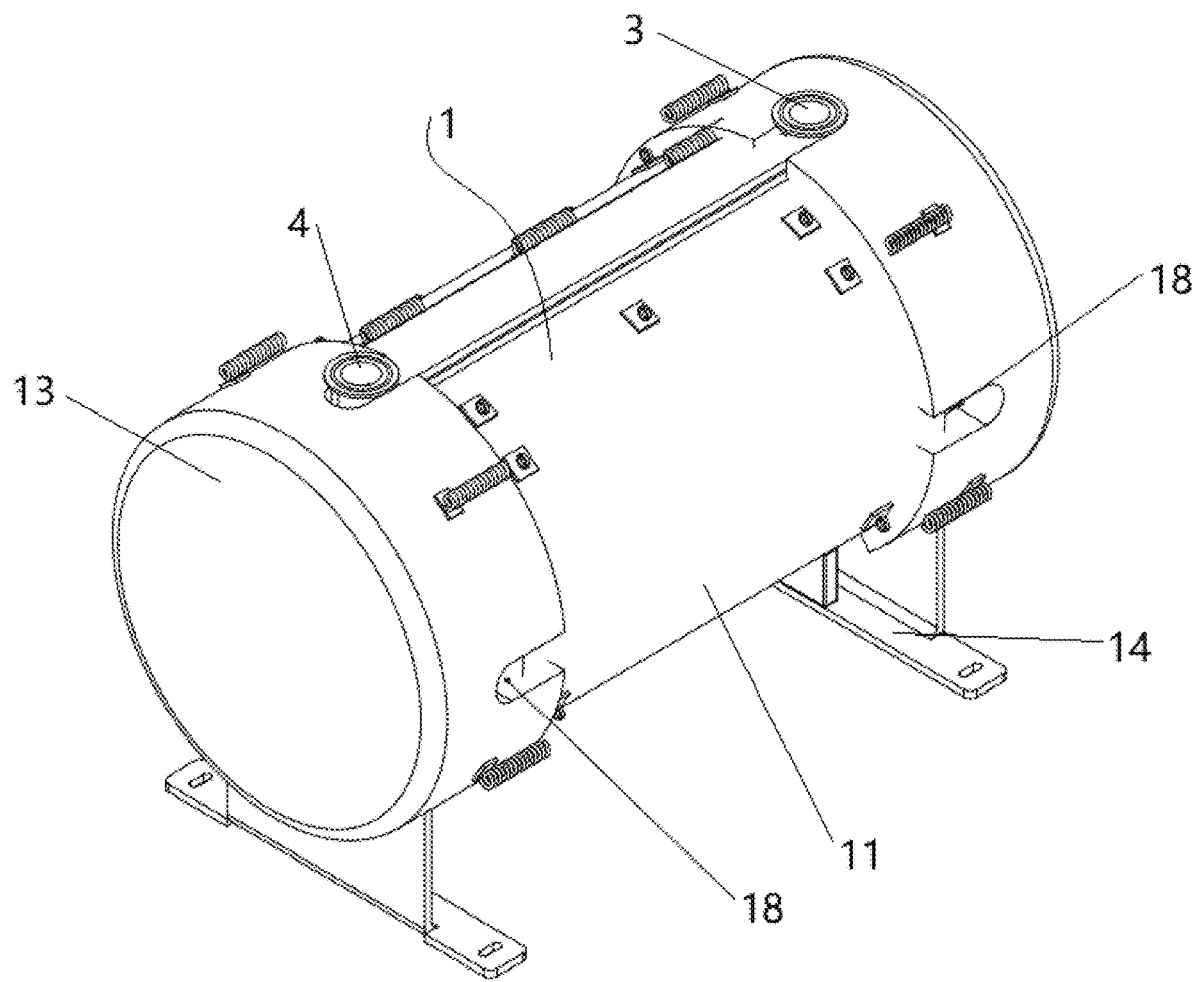
FIG. 2 shows a schematic structural diagram of a three-way catalytic converter according to an embodiment of the disclosure.

In FIGS. 1 and 2, 1 represents cylindrical housing, 2 represents three-way catalytic assembly, 3 represents tail gas inlet, 4 represents tail gas outlet, 5 represents heater, 6 represents first cavity, 7 represents second cavity, 8 represents three-way catalytic filter element, 9 represents third cavity, 10 represents protective sleeve, 11 represents cylinder body, 12 represents cover plate, 13 represents thermal insulation sleeve, 14 represents bracket, 15 represents sealing gasket, 16 represents air-mixing connecting port, 17 represents spare connecting port, 18 represents first connecting port, and 19 represents second connecting port.

With reference to FIGS. 1 and 2, the disclosure relates to a three-way catalytic converter, including: a cylindrical housing 1 having the function of carrying various components. In this embodiment, a receiving cavity is formed in the cylindrical housing 1 so that a three-way catalytic assembly 2 is provided therein. The three-way catalytic assembly 2 provided in the cylindrical housing 1 has the function of catalytically decomposing a tail gas. In this embodiment, the tail gas may be decomposed into harmless substances after passing through the three-way catalytic assembly 2. A tail gas inlet 3 and a tail gas outlet 4 are provided at the top of the cylindrical housing 1 and communicated with the cylindrical housing 1. The tail gas from a vehicle, a degreasing furnace, or the like may be received by the tail gas inlet 3. The tail gas may be decomposed into harmless substances by the tail gas outlet 4 and be discharged to the outside world. A heater 5 is circumferentially wrapped around the outer side wall of the cylindrical housing 1. Because the heater is wrapped around the outer side wall of the cylindrical housing 1, the heater 5 only needs to be energized to be able to effectively heat the three-way catalytic assembly 2, so that the temperature of the three-way catalytic assembly 2 in the receiving cavity rapidly increases. The mode of heating and catalysis, on the one hand, improves catalytic efficiency, and on the other hand, removes hazardous substances of the tail gas that are easy to react and easy to be decomposed. There is no need to increase the thickness and uniformity of a precious metal plating layer, and the surface area of a ceramic carrier, etc. The requirements for the thickness and uniformity of the plating layer, and the surface area of the ceramic carrier are reduced effectively. Optionally, in this embodiment, the heater 5 may be directly connected to a power supply through a plug or through other forms of power supply such as a transformer or a battery. Further, a switch is provided between the heater 5 and the plug, which enables heating and stopping heating.

The working principle of the device is as follows: firstly, the heater 5 is energized to increase the temperature of the three-way catalytic assembly 2. Then, the tail gas is discharged into the receiving cavity of the cylindrical housing 1 through the tail gas inlet 3. The tail gas comes into contact with the warmed-up three-way catalytic assembly 2 and reacts to be decomposed into the harmless substances, which are discharged out of the tail gas outlet 4.

From the forgoing description, it may be seen that the disclosure realizes the following technical effects:

In an embodiment of the disclosure, a mode for increasing a three-way catalytic temperature is used to heat the three-way catalytic assembly 2 by energizing the heater 5 circumferentially wrapped around the outer side wall of the cylindrical housing 1 to achieve the objective of increasing the catalytic efficiency by increasing the temperature by heating instead of increasing the thickness and uniformity of the precious metal plating layer, and the surface area of the ceramic carrier. This hence realizes the technical effect of lowering the requirements for the thickness and uniformity of the plating layer, and the surface area of the ceramic carrier, and thus solves the technical problem of the excessive requirements for the thickness and uniformity of the plating layer, and the surface area of the ceramic carrier caused by the need to enhance the catalytic efficiency.

Optionally, a first cavity 6 is formed between the three-way catalytic assembly 2 and the right end of the cylindrical housing 1. A second cavity 7 is formed between the three-way catalytic assembly 2 and the left end of the cylindrical housing 1. The tail gas inlet 3 is communicated with the first cavity 6. The tail gas outlet 4 is communicated with the second cavity 7. The tail gas discharged from the tail gas inlet 3 may be mixed with air therein uniformly through the first cavity 6, and then be catalytically decomposed by the three-way catalytic assembly 2. The decomposed harmless substances may be stored temporarily through the second cavity 7 and finally discharged out of the tail gas outlet 4.

Optionally, the three-way catalytic assembly 2 consists of a plurality of three-way catalytic filter elements 8 arranged in series in the axial direction of the cylindrical housing 1. A third cavity 9 is formed between two of the three-way catalytic filter elements 8. The two three-way catalytic filter elements 8 are Optionally disclosed. The third cavity 9 formed between two of the three-way catalytic filter elements 8 may uniformly mix decomposed and undecomposed tail gases once again, and then convey a mixture to the next three-way catalytic filter element 8 to be catalyzed and decomposed once more. Multistage catalysis is adopted to ensure catalytic quality while lowering the performance requirements of the single filter element. Further, the periphery of the three-way catalytic filter element 8 is wrapped with a protective sleeve 10. The protective sleeve 10 serves to protect the three-way catalytic filter element 8. Further, the three-way catalytic filter element 8 is detachably provided in the cylindrical housing 1. The three-way catalytic filter element 8 may be removed for replacement according to an actual situation.

Optionally, the cylindrical housing 1 may include: a cylinder body 11 having an open structure at two ends and mainly configured to carry the three-way catalytic assembly 2, two cover plates 12 provided at the two ends of the cylinder body 11, respectively, and mainly configured to close the two open ends of the cylinder body 11, two thermal insulation sleeves 13 provided on the outer sides of the two cover plates 12, preventing the loss of heat, and thus avoiding temperature transition and the reduction of the catalytic efficiency, and two brackets 14 provided at the bottom of the cylinder body 11, respectively near the two ends of the cylinder body 11 and configured to support at the bottom and improve overall stability. A sealing gasket 15 is provided between the cover plate 12 and the cylinder body 11, and configured to improve sealing performance, and further ensure that the heat is not easy to be lost.

Optionally, the bottom of the cylindrical housing 1 is provided with an air-mixing connecting port 16 and a spare connecting port 17. The air-mixing connecting port 16 is communicated with the first cavity 6. The spare connecting port 17 is communicated with the second cavity 7. The air-mixing connecting port 16 is connected to an air pipeline, so that the air may be discharged into the first cavity of the cylindrical housing 1 and be mixed with the tail gas to provide sufficient air required by reaction and decomposition. The spare connecting port 17 may be used as a replacement when other connecting ports are clogged. For example, the decomposed harmless substances may be discharged through the spare connecting port 17 when the tail gas outlet 4 is clogged.

Optionally, the cylindrical housing 1 is provided with two first connecting ports 18 connected to a pressure detecting device communicated with the first cavity 6 and the second cavity 7, respectively. The pressure detecting device may be connected to the two first connecting ports 18 respectively for detecting the atmospheric pressure in the first cavity 6 and the second cavity 7. When the difference in the atmospheric pressure is higher than a preset value, the heater 5 is turned off. The original three-way catalytic filter element 8 is removed, and then replaced with a new three-way catalytic filter element 8.

Optionally, the cylindrical housing 1 is provided with two second connecting ports 19 connected to a temperature detecting device communicated with the first cavity 6 and the second cavity 7, respectively. The temperature detecting device may be connected to each of the two second connecting ports 19 to detect the temperature of the atmospheres in the first cavity 6 and the second cavity 7, so that it may be determined whether the temperature in the receiving cavity meets catalytic requirements based on the measured temperature.

The foregoing are merely optional embodiments of the disclosure and are not intended to limit the disclosure. For a person skilled in the art, the disclosure may have various changes and variations. Any modification, equivalent replacement and improvement made within the spirit and principle of the disclosure shall be included within the protection scope of the disclosure.

Various embodiments of the disclosure may have one or more of the following effects. In some embodiments, the disclosure may help to solve the technical problem of excessive requirements for the thickness and uniformity of a plating layer, and the surface area of a ceramic carrier caused by the need to enhance catalytic efficiency. In other embodiments, the disclosure may provide a three-way catalytic converter and a device for processing a tail gas, which may help to solve the problem of excessive requirements for the thickness and uniformity of a plating layer, and the surface area of a ceramic carrier caused by the need to enhance catalytic efficiency. In further embodiments, the device for processing the tail gas includes a three-way catalytic converter.

According to some embodiment of the disclosure, a mode for increasing a three-way catalytic temperature may be used to heat the three-way catalytic assembly by energizing the heater circumferentially wrapped around the outer side wall of the cylindrical housing to increase catalytic efficiency by increasing the temperature by heating instead of increasing the thickness and uniformity of a precious metal plating layer, and the surface area of a ceramic carrier. Such embodiment may show the technical effect of lowering the requirements for the thickness and uniformity of the plating layer, and the surface area of the ceramic carrier, and thus may help to solve the technical problem of the excessive requirements for the thickness and uniformity of the plating layer, and the surface area of the ceramic carrier caused by the need to enhance the catalytic efficiency.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A three-way catalytic converter assembly, comprising:
   a cylindrical housing configured to convey a tail gas, the cylindrical housing including: a tail gas inlet and a tail gas outlet each provided at a top of the cylindrical housing, and an air-mixing inlet connecting port and a spare connecting port each provided at a bottom of the cylindrical housing so as to extend parallel to each other;
   at least one three-way catalytic filter element arranged in the cylindrical housing; and
   a heater circumferentially wrapped around an outer side wall of the cylindrical housing, the heater configured to be energized so as to heat the at least one three-way catalytic filter element;
   wherein the air-mixing inlet connecting port is arranged upstream of the at least one three-way catalytic filter element so as to introduce secondary air into the tail gas, and
   wherein the spare connecting port is arranged downstream of the at least one three-way catalytic filter element so as to discharge treated tail gas when the tail gas outlet is clogged.

2. The three-way catalytic converter according to claim 1, wherein:
   a first cavity is defined between the three-way catalytic filter element and an upstream end of the cylindrical housing, the first cavity communicating with the tail gas inlet; and
   a second cavity is defined between the three-way catalytic filter element and a downstream end of the cylindrical housing, the second cavity communicating with the tail gas outlet.

3. The three-way catalytic converter according to claim 2, wherein:
   the air-mixing inlet connecting port is connected to the first cavity; and
   the spare connecting port is connected to the second cavity.

4. The three-way catalytic converter according to claim 2, wherein the cylindrical housing further includes two first connecting ports respectively communicating with the first cavity and the second cavity, the two first connecting ports connected to a pressure detecting device.

5. The three-way catalytic converter according to claim 2, wherein the cylindrical housing further includes two second connecting ports respectively communicating with the first cavity and the second cavity, the two first connecting ports connected to a temperature detecting device.

6. The three-way catalytic converter according to claim 1, wherein:
   the at least one three-way catalytic filter element includes a plurality of three-way catalytic filter elements arranged in series along an axial direction of the cylindrical housing; and
   a third cavity is defined between two adjacent three-way catalytic filter elements of the plurality of three-way catalytic filter elements.

7. The three-way catalytic converter according to claim 6, wherein the plurality of three-way catalytic filter elements is detachably arranged in the cylindrical housing.

8. The three-way catalytic converter according to claim 6, wherein a periphery of the plurality of three-way catalytic filter elements is wrapped with a protective sleeve.

9. The three-way catalytic converter according to claim 1, wherein the cylindrical housing further includes:
   a cylinder body,
   a first cover plate and a second cover plate respectively arranged at the first end and the second end,
   two thermal insulation sleeves respectively arranged on outer sides of the first cover plate and the second cover plate,
   two brackets each provided at a bottom of the cylinder body, the two brackets respectfully arranged at the first end and the second end, and
   a sealing gasket arranged between the cylinder body and one of the first cover plate or the second cover plate.

10. A device for processing a tail gas, the device comprising the three-way catalytic converter assembly according to claim 1.

\* \* \* \* \*